(12) United States Patent
    Burling

(10) Patent No.: US 9,862,436 B2
(45) Date of Patent: Jan. 9, 2018

(54) DEVICE TO ENHANCE THE TRACTION OF A TRACKED VEHICLE

(76) Inventor: John Menzies Burling, Eltham (NZ)

( * ) Notice: Subject to any disclaimer, the term of this patent is extended or adjusted under 35 U.S.C. 154(b) by 1335 days.

(21) Appl. No.: 13/577,635

(22) PCT Filed: Feb. 8, 2011

(86) PCT No.: PCT/NZ2011/000015
§ 371 (c)(1),
(2), (4) Date: Oct. 19, 2012

(87) PCT Pub. No.: WO2011/096829
PCT Pub. Date: Aug. 11, 2011

(65) Prior Publication Data
US 2013/0049452 A1    Feb. 28, 2013

Related U.S. Application Data

(60) Provisional application No. 61/302,315, filed on Feb. 8, 2010, provisional application No. 61/312,793, filed
(Continued)

(51) Int. Cl.
*B62D 55/28*    (2006.01)

(52) U.S. Cl.
CPC .................................. *B62D 55/286* (2013.01)

(58) Field of Classification Search
CPC ...... B62D 55/08; B62D 55/286; B62D 55/26; B62D 55/28
(Continued)

(56) References Cited

U.S. PATENT DOCUMENTS 2,129,557 A * 9/1938 Beach .................. B62D 55/275
                                                                  305/188
3,802,751 A * 4/1974 Beyers .......................... 305/162
(Continued)

FOREIGN PATENT DOCUMENTS

CA    2690367 A1    7/2011
EP    0579211 A2    1/1994
(Continued)

OTHER PUBLICATIONS

International Search Report for International Application No. PCT/NZ2011/000015, dated May 19, 2011.
(Continued)

*Primary Examiner* — S. Joseph Morano
*Assistant Examiner* — Jean Charleston
(74) *Attorney, Agent, or Firm* — Clark & Elbing LLP

(57) ABSTRACT

A device 1 for use with a continuous track 3 of a tracked vehicle to enhance the traction of the vehicle. The device 1 has an elongate body 5 having a ground contacting surface 6 and a releasable bracket 7 for releasably securing the elongate body 5 to the continuous track 3. The releasable bracket 7 has a bracket body 11, a first clamping member 13, a second clamping member 15 extending at an angle relative to the first clamping member, and a fastener 17. The bracket is arranged such that fastening the fastener 17 causes the second clamping member 15 to draw the first clamping member 13 towards the elongate body 5 to releasably secure the elongate body 5 to the continuous track 3. The device has one or more ground engaging features 39. A kit of parts is also described.

42 Claims, 17 Drawing Sheets

Related U.S. Application Data on Mar. 11, 2010, provisional application No. 61/376,467, filed on Aug. 24, 2010.

(58) Field of Classification Search
USPC ........... 305/51, 160–162, 180, 187, 190–192
See application file for complete search history.

(56) References Cited

U.S. PATENT DOCUMENTS

| | | | |
|---|---|---|---|
| 3,883,190 A | | 5/1975 | Kilbane, Jr. |
| 4,109,971 A | * | 8/1978 | Black .................. B62D 55/275 305/51 |
| 4,123,119 A | * | 10/1978 | Stedman ............. B62D 55/286 305/187 |
| 4,165,137 A | * | 8/1979 | Stedman ................ B62D 55/28 228/152 |
| 4,428,625 A | * | 1/1984 | Wohlford ..................... 305/108 |
| 5,388,900 A | | 2/1995 | Suzuki |
| 5,451,001 A | * | 9/1995 | Kumm ......................... 239/726 |
| 5,713,645 A | * | 2/1998 | Thompson ............. B62D 55/26 305/168 |
| 5,769,511 A | * | 6/1998 | Hattori ........................... 305/51 |
| RE36,025 E | | 1/1999 | Suzuki |
| 6,299,265 B1 | | 10/2001 | Hoffart |
| 6,540,310 B1 | | 4/2003 | Cartwright |
| 6,557,954 B1 | | 5/2003 | Hattori |
| 6,637,840 B2 | | 10/2003 | Zaleski et al. |
| 7,900,723 B2 | * | 3/2011 | Brazier ........................ 180/9.44 |
| 7,901,015 B1 | | 3/2011 | Anderson |
| 7,901,051 B2 | * | 3/2011 | McAvoy et al. ................ 347/54 |
| 9,260,145 B2 | * | 2/2016 | Korus .................... B62D 55/04 |
| 2003/0184157 A1 | | 10/2003 | McNutt et al. |
| 2004/0140717 A1 | | 7/2004 | McNutt et al. |
| 2004/0174068 A1 | | 9/2004 | McNutt et al. |

FOREIGN PATENT DOCUMENTS

| | | |
|---|---|---|
| JP | 2001253375 A | 9/2001 |
| JP | 2004058688 A | 2/2004 |
| WO | WO-2004/052684 A2 | 6/2004 |
| WO | WO-2008/155425 A1 | 12/2008 |

OTHER PUBLICATIONS

International Preliminary Report on Patentability for International Application No. PCT/NZ2011/000015, dated Jan. 9, 2012.

Response to the International Search Report and Written Opinion issued in connection with International Application No. PCT/NZ2011/000015, dated Dec. 6, 2011.

* cited by examiner

DEVICE TO ENHANCE THE TRACTION OF A TRACKED VEHICLE

FIELD OF THE INVENTION

This invention relates to a device for use with a continuous track of a tracked vehicle to enhance the traction of the vehicle.

BACKGROUND

Continuous tracks are often used on off-road vehicles to provide ground contact and traction for large vehicles. Standard continuous tracks are formed from a number of rigid track shoes that are joined to each other by hinges. Each track shoe typically has one or more ribs extending along the shoe to provide traction. Standard continuous tracks provide traction in general situations. However, those standard tracks do not provide adequate traction on steeps slopes, or slopes that are slippery from mud, water or ice. In particular, those standard tracks do not provide adequate traction on steep or slippery slopes for larger, heavier vehicles.

Typically, to increase the traction of a tracked vehicle, additional traction devices are welded to the track. However, those traction devices can only be removed by being cut free, which can damage the track and/or the device. Welding the traction devices to the track and cutting the devices free from the track can be difficult and time consuming.

There are a number of devices for use with the continuous track of a tracked vehicle. Examples of such devices are described in US Re 36,02 that describes a detachable elastic pad to protect a road surface from damage caused by a tracked vehicle; JP 2001233375 that describes a padded shoe for a track belt; and NZ 511373 that describes an elastic pad for a crawler track shoe. The pads described in those documents are designed to reduce damage to the ground and would not provide good stability to a vehicle on a steep or slippery slope.

U.S. Pat. No. 6,540,310 describes a grouser structure that provides traction and shock absorption and JP 2004058688 describes a detachable grouser for a track. Both those documents describe using fasteners that extend through the track, which can be awkward to assemble if the track is already installed on a vehicle.

US 2004/0174068, US 2003/0184157, and US 2004/0140717 each describes a detachable grouser assembly for use with vehicles having continuous tracks. Those documents describe attaching the grousers with fasteners that extend through the track shoe or with chains that extend over the track shoe. As described above, attaching a grouser assembly with fasteners can be awkward if the track is already installed on a vehicle. Attaching a grouser assembly using a chain is not very secure and the assembly could be ripped off when the vehicle is used.

U.S. Pat. No. 6,299,265 describes a replaceable tyre gripping system for an endless track to extend the life of a track. The system described in this document would not enhance the traction of a tracked vehicle.

In this specification where reference has been made to patent specifications, other external documents, or other sources of information, this is generally for the purpose of providing a context for discussing the features of the invention. Unless specifically stated otherwise, reference to such external documents or such sources of information is not to be construed as an admission that such documents or such sources of information, in any jurisdiction, are prior art or form part of the common general knowledge in the art.

It is an object of at least preferred embodiments of the present invention to provide a device to enhance the traction of a vehicle having a continuous track, and/or to at least provide the public with a useful choice.

SUMMARY OF THE INVENTION

In accordance with a first aspect of the present invention, there is provided a device for use with a continuous track of a tracked vehicle to enhance the traction of the vehicle, the device comprising:

an elongate body having an elongate direction and a ground contacting surface; and a releasable bracket for releasably securing the elongate body to the continuous track, the bracket comprising a bracket body, a first clamping member extending from the bracket body, a second clamping member extending from the bracket body at an angle relative to the first clamping member, and a fastener;

wherein the bracket is arranged such that fastening the fastener causes the bracket body to wedge the elongate body and the track shoe between the first clamping member and the second clamping member.

In one embodiment the bracket is arranged such that fastening the fastener draws the releasable bracket in the elongate direction of the elongate body and causes the second clamping member to draw the first clamping member towards the elongate body in a direction generally transverse to the elongate direction to releasably secure the elongate body to the continuous.

In one embodiment the bracket comprises a clearance aperture through which the fastener extends.

The term 'comprising' as used in this specification means 'consisting at least in part of'; that is to say when interpreting statements in this specification which include 'comprising', the features prefaced by this term in each statement all need to be present but other features can also be present. Related terms such as 'comprise' and 'comprised' are to be interpreted in a similar manner.

The device may further comprise a fixed bracket that is fixed to the elongate body. The fixed bracket may be integrally formed with the elongate body. Alternatively, the fixed bracket may be formed as a separate component and fixed to the elongate body by fasteners, for example.

In one embodiment, the releasable bracket is arranged to releasably secure one end of the elongate body to one side of the continuous track and the fixed bracket is arranged to secure the other end of the elongate body to other side of the continuous track. In an alternative embodiment, the device may comprise two releasable brackets for releasably connecting the device to the shoe of the continuous track, and each releasable bracket may have the bracket body, the first clamping member, the second clamping member extending at an angle relative to the first clamping member, and the fastener.

The first clamping member of the releasable bracket may comprise one or more projections for engaging with a surface of the elongate body. The projections may be circular stud(s). The circular stud(s) may extend(s) substantially perpendicularly from the bracket body. Alternatively, the projections may be ribs, plates, bosses, or shoulders, for example.

The second clamping member may comprise a leg extending at an angle from the bracket body. The leg may be integrally formed with the bracket body.

The device may have additional ground contacting features to further enhance the traction of the device.

The ground contacting surface of the elongate body may have a generally triangular cross-sectional profile. The cross-sectional profile of the ground contacting surface may be substantially constant along the length of the elongate body. The elongate body may be substantially rigid.

In one embodiment, the elongate body is adapted to nest between ribs of a track shoe of the continuous track.

In one embodiment, the elongate body extends across the transverse length of the track shoe, from one end of the track shoe to the other end of the track shoe.

In accordance with a second aspect of the present invention, there is provided a device for use with a continuous track of a tracked vehicle to enhance the traction of the vehicle, the device comprising:
an elongate body having a surface;
a bracket arranged to secure the elongate body to the continuous track; and
a plurality of rigid teeth operatively attached to the elongate body and projecting beyond the surface of the elongate body.

In one embodiment, the bracket comprises a ground engaging feature(s).

In one embodiment, the elongate body enhances traction of the vehicle in the running direction of the track and the ground engaging feature(s) of the bracket enhance(s) traction of the vehicle in a direction transverse to the running direction of the track.

In one embodiment, the device is releasably secured to the continuous track.

The elongate body is adapted to nest between ribs of a track shoe of the continuous track. The elongate body may nest between two side ribs of the track shoe and extend over an intermediate rib positioned between the two side ribs. When assembled with the track shoe, the elongate body may substantially fill the gap between the side ribs and contacts the side ribs. Alternatively, the elongate body may nest between two adjacent side ribs. The elongate member extends across the transverse length of the track shoe, from one end of the track shoe to the other end of the track shoe.

In one embodiment, the device comprises a releasable bracket for releasably securing the elongate body to the continuous track.

In one embodiment, the releasable bracket comprises a bracket body, a first clamping member, a second clamping member extending at an acute angle relative to the first clamping member, and a fastener, wherein the bracket is arranged such that fastening the fastener causes the bracket body to wedge the elongate body and the track shoe between the first clamping member and the second clamping member.

In one embodiment, the device further comprises a further bracket for releasably securing the elongate body to the other side edge of the continuous track, the further bracket comprising a bracket body.

In one embodiment, the further bracket is a fixed bracket that is permanently fixed to the elongate body. The fixed bracket may be integrally formed with the elongate body. Alternatively, the fixed bracket may be formed as a separate component and fixed to the elongate body by fasteners, for example.

The elongate body may be substantially rigid.

In one embodiment, the further bracket is a releasable bracket that is releasably secured to the elongate body.

In one embodiment, the bracket body/bodies form a ground engaging feature(s).

In one embodiment, a top surface of the bracket(s) is a substantially planar surface for contacting the ground surface.

In one embodiment, a top surface of the bracket(s) has serrations or teeth for contacting the ground surface.

In one embodiment, the bracket(s) is/are positioned at the end(s) of the elongate body.

The plurality of teeth may be evenly or unevenly spaced along the length of the elongate body.

In one embodiment, each of the teeth may have a generally chevron or inverted V-shaped ground engaging surface, when viewed from an end of the elongate body. Each of the teeth may have an abutment face for attaching the tooth to the elongate body. The elongate body may have a generally triangular or inverted V-shaped cross-sectional profile and the abutment face of each tooth may be a generally chevron or inverted V-shaped face generally corresponding to the profile of the elongate body.

In one embodiment, the teeth may have a generally chevron or inverted V-shaped ground engaging surface, when viewed from a side of the elongate body. The teeth may be separate parts or may be connected together to form a saw tooth-like part.

In one embodiment, each tooth may have a generally flat and horizontal ground engaging surface, when viewed from an end of the elongate body. Each tooth may have an abutment face for attaching the tooth to the elongate body. The elongate body may have a generally triangular or inverted V-shaped cross-sectional profile and the abutment face of each tooth may be a generally chevron or inverted V-shaped face generally corresponding to the profile of the elongate body. Additionally, the track may have a grouser extending across the transverse length of the track shoe, from one end of the track shoe to the other end of the track shoe and the tooth may have a recess having a profile corresponding to the profile of the grouser. The grouser may have a substantially wedge-shaped profile and each tooth may have a corresponding wedge-shaped recess.

Each tooth may have a slot adapted to receive one or more additional ground engaging feature. The additional ground engaging feature(s) may be teeth. Those teeth may have a generally chevron or inverted V-shaped ground engaging surface, when viewed from a side of the elongate body. The teeth may be separate parts or may be connected together to form a saw tooth-like part.

In one embodiment, the releasable bracket is arranged to releasably secure one end of the elongate body to one side of the continuous track and the fixed bracket is arranged to secure the other end of the elongate body to other side of the continuous track.

The second aspect may include any one or more features of the first aspect above.

In accordance with a third aspect of the present invention, there is provided a combination of a track shoe and at least one device of the first, second or third aspects described above secured to the track shoe.

The track shoe may comprise side ribs with a gap between the side ribs. The elongate body of the device may substantially fill the gap between the side ribs and contact the side ribs The track shoe may further comprise an intermediate rib positioned between the two side ribs. The elongate body may nest between two side ribs of the track shoe and extend over the intermediate rib. Alternatively, the elongate body may nest between two adjacent ribs.

The elongate body may extend across the transverse length of the track shoe, from one end of the track shoe to the other end of the track shoe.

The elongate body may be adapted to nest between ribs of a track shoe of the continuous track. The elongate body may nest between two side ribs of the track shoe and extend over an intermediate rib positioned between the two side ribs. The elongate body may substantially fill the gap between the side ribs and contacts the side ribs. Alternatively, the elongate body may nest between two adjacent side ribs. The elongate body extends across the transverse length of the track shoe, from one end of the track shoe to the other end of the track shoe.

The device may be releasably secured to the continuous track. The device may further comprise a releasable bracket for releasably securing the elongate body to the continuous track. The bracket may comprise a bracket body, a first clamping member, a second clamping member extending at an acute angle relative to the first clamping member, and a fastener, wherein the bracket is arranged such that fastening the fastener causes the bracket body to wedge the elongate body and the track shoe between the first clamping member and the second clamping member.

In one embodiment, the device further comprises a further bracket for releasably securing the elongate body to the other side edge of the continuous track. The further bracket may be a fixed bracket that is permanently fixed to the elongate body or may be a releasable bracket that is releasably secured to the elongate body. The fixed bracket may be integrally formed with the elongate body. Alternatively, the fixed bracket may be formed as a separate component and fixed to the elongate body by fasteners, for example.

The third aspect may include any one or more features of the first or second aspects above.

In accordance with a fourth aspect of the present invention, there is provided a combination of a continuous track with at least one device of the first or second aspects described above secured to the track.

The fourth aspect may include any one or more features of the first, second or third aspects above.

In accordance with a fifth aspect of the invention, there is provided a kit of parts for assembling a device for use with a continuous track of a tracked vehicle to enhance the traction of the vehicle, the kit of parts comprising:
an elongate body;
a bracket that is attachable to the elongate body to secure the elongate body to the continuous track; and
a plurality of rigid teeth that are attachable to the elongate body.

In one embodiment, the teeth may have a generally chevron or inverted V-shaped ground engaging surface when assembled with the elongate body. Each of the teeth may have an abutment face for attaching the tooth to the elongate body. The elongate body may have a generally triangular or inverted V-shaped cross-sectional profile and the abutment face of each tooth may be a generally chevron or inverted V-shaped face generally corresponding to the profile of the elongate body.

The teeth may be separate parts or may be connected together to form a saw tooth-like part.

In one embodiment, each tooth may have a generally flat and horizontal ground engaging surface, when viewed from an end of the elongate body. Each tooth may have an abutment face for attaching the tooth to the elongate body. The elongate body may have a generally triangular or inverted V-shaped cross-sectional profile and the abutment face of each tooth may be a generally chevron or inverted V-shaped face generally corresponding to the profile of the elongate body. Additionally, the track may have a grouser extending across the transverse length of the track shoe, from one end of the track shoe to the other end of the track shoe and the tooth may have a recess having a profile corresponding to the profile of the grouser. The grouser may have a substantially wedge-shaped profile and each tooth may have a corresponding wedge-shaped recess. Each tooth may have slots adapted to receive additional ground engaging features. The additional ground engaging features may be teeth. Those teeth may have a generally chevron or inverted V-shaped ground engaging surface, when viewed from a side of the elongate body. The teeth may be separate parts or may be connected together to form a saw tooth-like part.

The kit may comprise a pair of brackets arranged to secure the elongate body to the continuous track. The pair of brackets may comprise a fixed bracket and a releasable bracket.

The releasable bracket may comprise a bracket body, a first clamping member, a second clamping member extending at an acute angle relative to the first clamping member, and a fastener, wherein the bracket is arranged such that fastening the fastener causes the bracket body to wedge the elongate body and the track shoe between the first clamping member and the second clamping member.

The fixed bracket may be fixed to the elongate body. The fixed bracket may be integrally formed with the elongate body. Alternatively, the fixed bracket may be formed as a separate component and fixed to the elongate body by fasteners, for example.

In one embodiment, the releasable bracket is arranged to releasably secure one end of the elongate body to one side of the continuous track and the fixed bracket is arranged to secure the other end of the elongate body to other side of the continuous track.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting. Where specific integers are mentioned herein which have known equivalents in the art to which this invention relates, such known equivalents are deemed to be incorporated herein as if individually set forth.

As used herein the term '(s)' following a noun means the plural and/or singular form of that noun.

As used herein the term 'and/or' means 'and' or 'or', or where the context allows both.

The invention consists in the foregoing and also envisages constructions of which the following gives examples only.

BRIEF DESCRIPTION OF THE DRAWINGS

The present invention will now be described by way of example only and with reference to the accompanying drawings in which.

DETAILED DESCRIPTION OF EMBODIMENTS OF THE INVENTION

Figure 1:
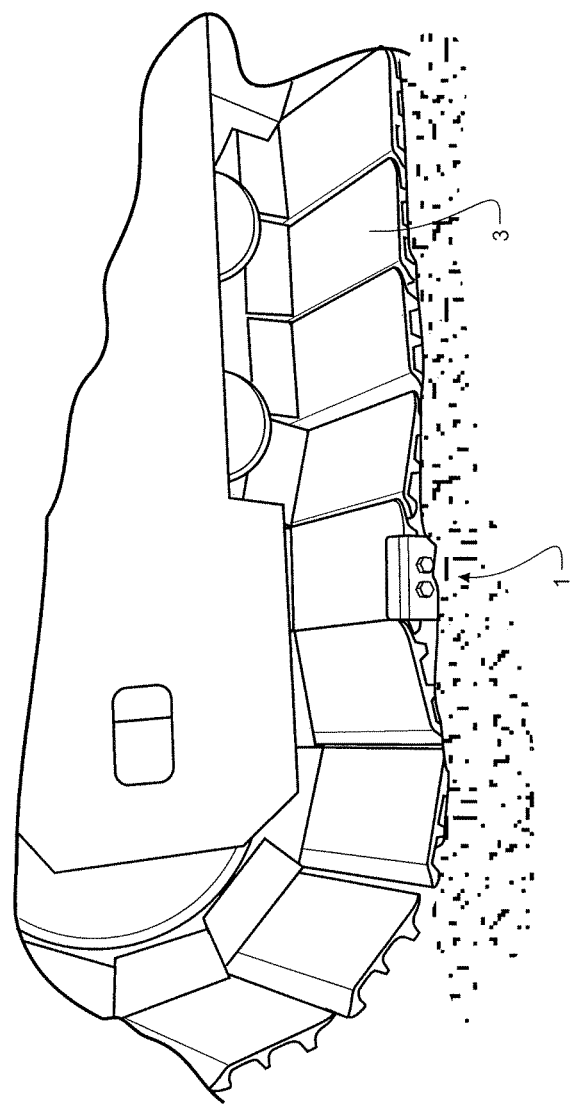
FIG. 1 is a perspective view of an embodiment of the device secured to a continuous track of a vehicle.
Figure 2:
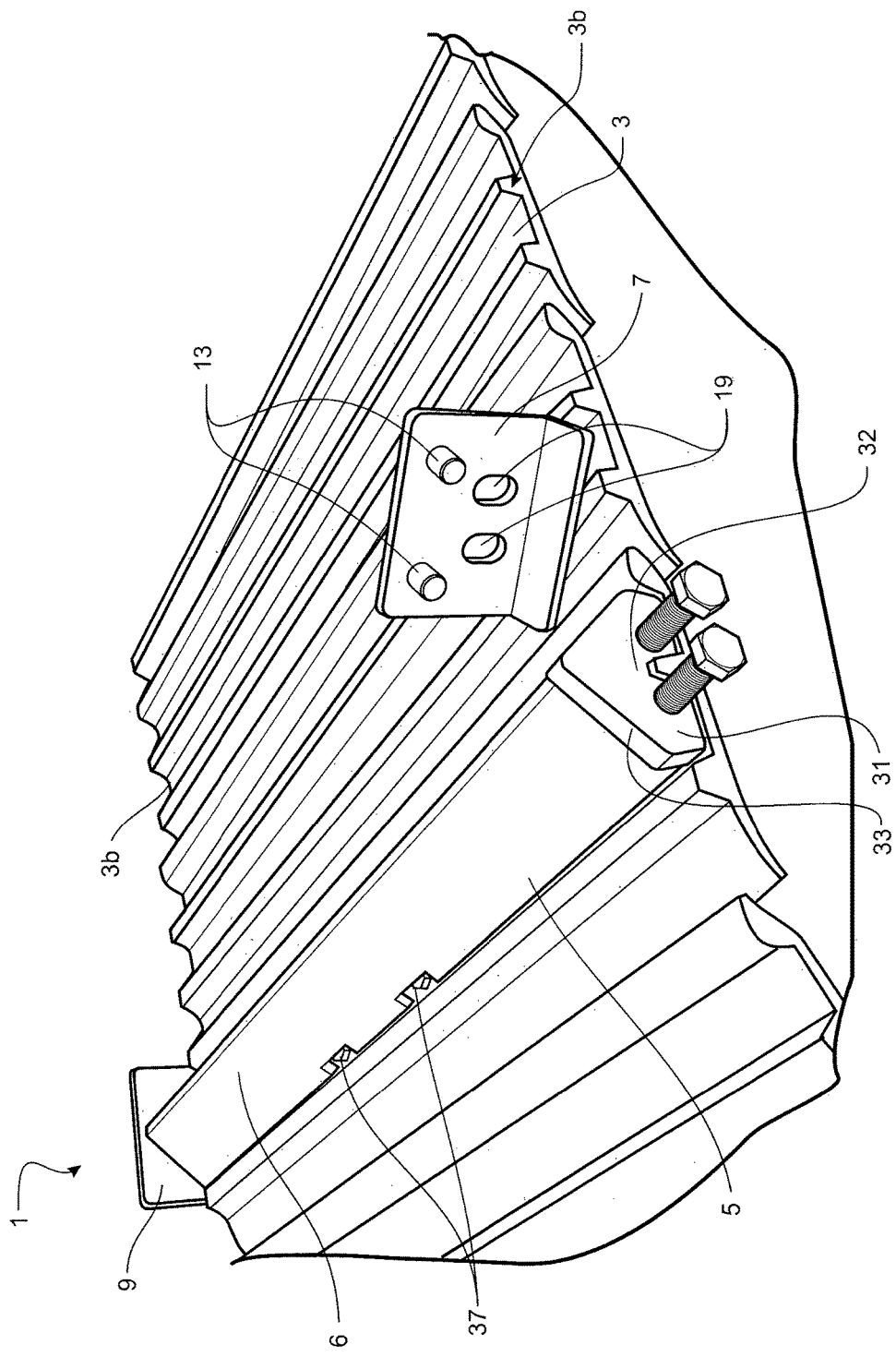
FIG. 2 is a perspective view of the device during assembly to the continuous track, before the releasable bracket is secured to the continuous track.

With reference to FIGS. 1 and 2, an embodiment of the device 1 for use with a continuous track 3 of a vehicle is shown. The device may be used on any tracked vehicle to enhance traction, such as a digger, bulldozer, snowmobile, crawler, or tank, for example.

Unless otherwise specified, it should be appreciated that references to directions in the following description such as top, upper, lower, inverted or leading are for reference only, and should not be considered limiting.

The device 1 comprises a rigid elongate body 5 having a ground contacting surface 6 and a pair of brackets for releasably securing the elongate body 5 to the continuous track 3. In the embodiment shown, the pair of brackets comprises a releasable bracket 7 and a fixed bracket 9. The brackets are rigid brackets.

Figure 3:
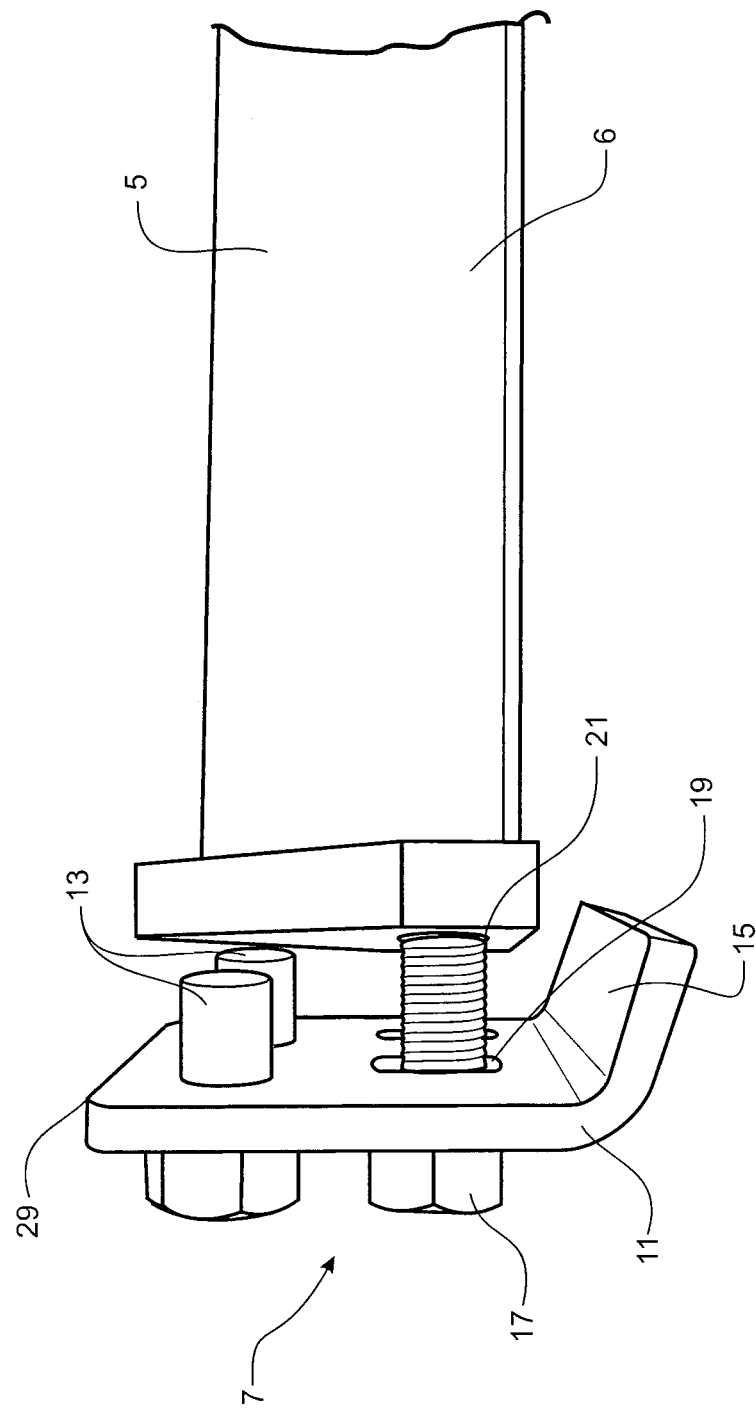
FIG. 3 is a side view of the releasable bracket and elongate body of the embodiment device.

With reference to FIG. 3, the releasable bracket 7 has a bracket body 11 and first clamping members, in the form of two studs 13. In the embodiment shown, the studs are bolts that are welded to the bracket body. The studs extend generally perpendicularly from the bracket body. The releasable bracket 7 has a second clamping member in the form of a bracket leg 15. The bracket leg 15 extends downwardly at an angle from the bracket body 11 and at a non-parallel angle relative to the two studs 13. The angle is any suitable angle. In the embodiment shown, the angle is about 30°.

The releasable bracket 7 has at least one fastener 17 extending through the bracket body 11 into the elongate body 5. In the embodiment shown, the releasable bracket 7 has a pair of fasteners 17. The fasteners extends through clearance slots 19 in the bracket body 11 and engages with corresponding threaded holes 21 formed in the elongate body 5. The fasteners are positioned in the lower part of the bracket body so that the clamping force provided by the fasteners is close to the track shoe.

Figure 5:
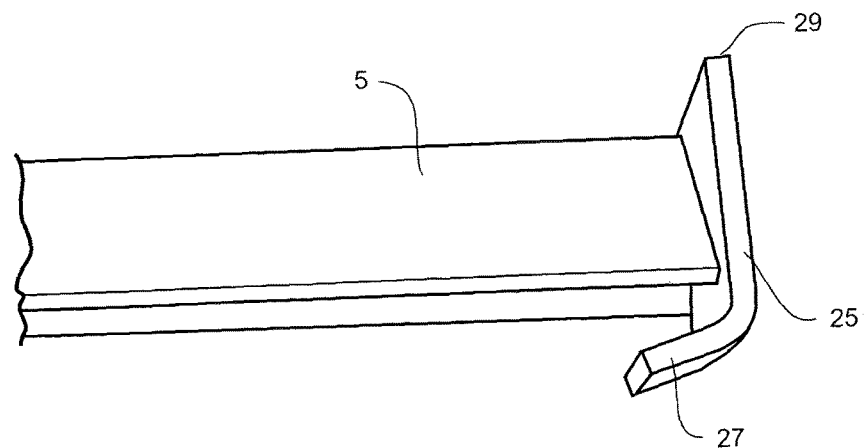
FIG. 5 is a partial side view of the fixed bracket and elongate body.

With reference to FIG. 5, the fixed bracket is similar to the releasable bracket, except that it is permanently fixed to the elongate body 5. The fixed bracket has a bracket body 25 and a bracket leg 27 extending downwardly at an angle from the bracket body 25.

The device 1 has a pair of ground engaging features projecting beyond the rigid surface of the elongate body. In the embodiment shown, the ground engaging features are formed by a flat upper surface 29 of each bracket body. When assembled, the ground engaging features are positioned at the ends of the elongate body.

In an alternative embodiment, the upper surface 29 of the bracket may have projections for contacting the ground surface. For example, the top surface of the bracket may have serrations or teeth for contacting the ground surface. The elongate body suitably enhances traction of the vehicle in the running direction of the track and the ground engaging features suitably enhance traction of the vehicle in a direction transverse to the running direction of the track.

With reference to FIG. 2, the elongate body 5 has a generally triangular cross-sectional profile and the ground contacting surface 6 has a corresponding generally triangular cross-sectional profile. In the embodiment shown, the cross-sectional profile of the ground contacting surface 6 is generally constant along the length of the elongate body. In an alternative embodiment, the ground contacting surface may comprise outwardly extending features to further enhance the traction of the device. In a further alternative embodiment, the ground contacting surface may have any other suitable cross-sectional profile, such as an M-shape, for example.

Figure 4:
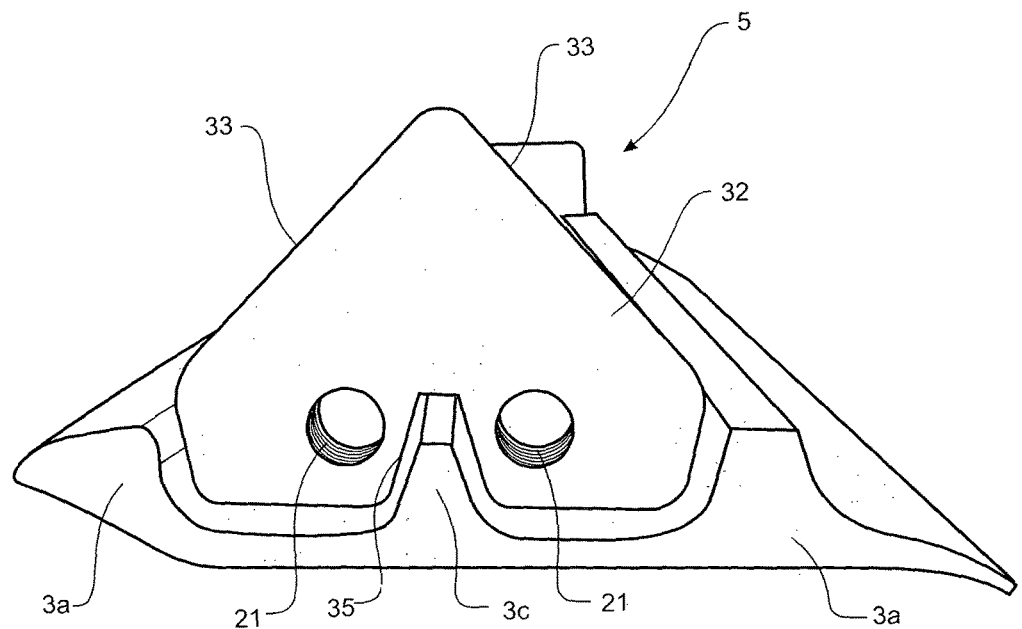
FIG. 4 is an end view of the elongate body and a single shoe of the continuous track.

With reference to FIGS. 2 and 4, one end of the elongate body 5 has a side plate 32 forming outwardly extending flanges 33. When assembled, the studs contact the outer surfaces of the flanges. Alternatively, the elongate body 5 may be formed without the flanges and the studs could contact the ground contacting surface of the elongate body, for example.

Figure 7:
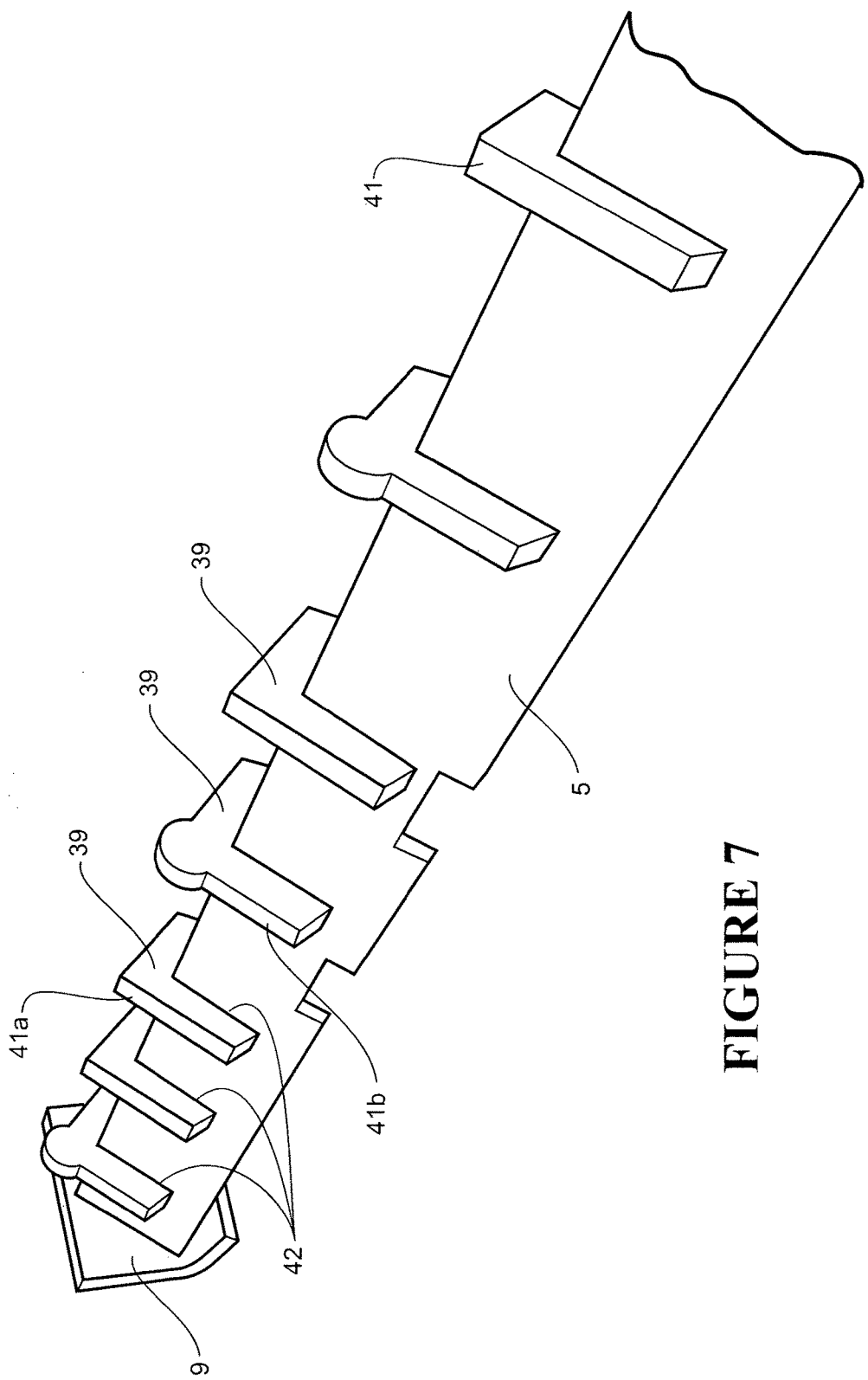
FIG. 7 is a perspective view of an embodiment of the device having ground engaging features.
Figure 8:
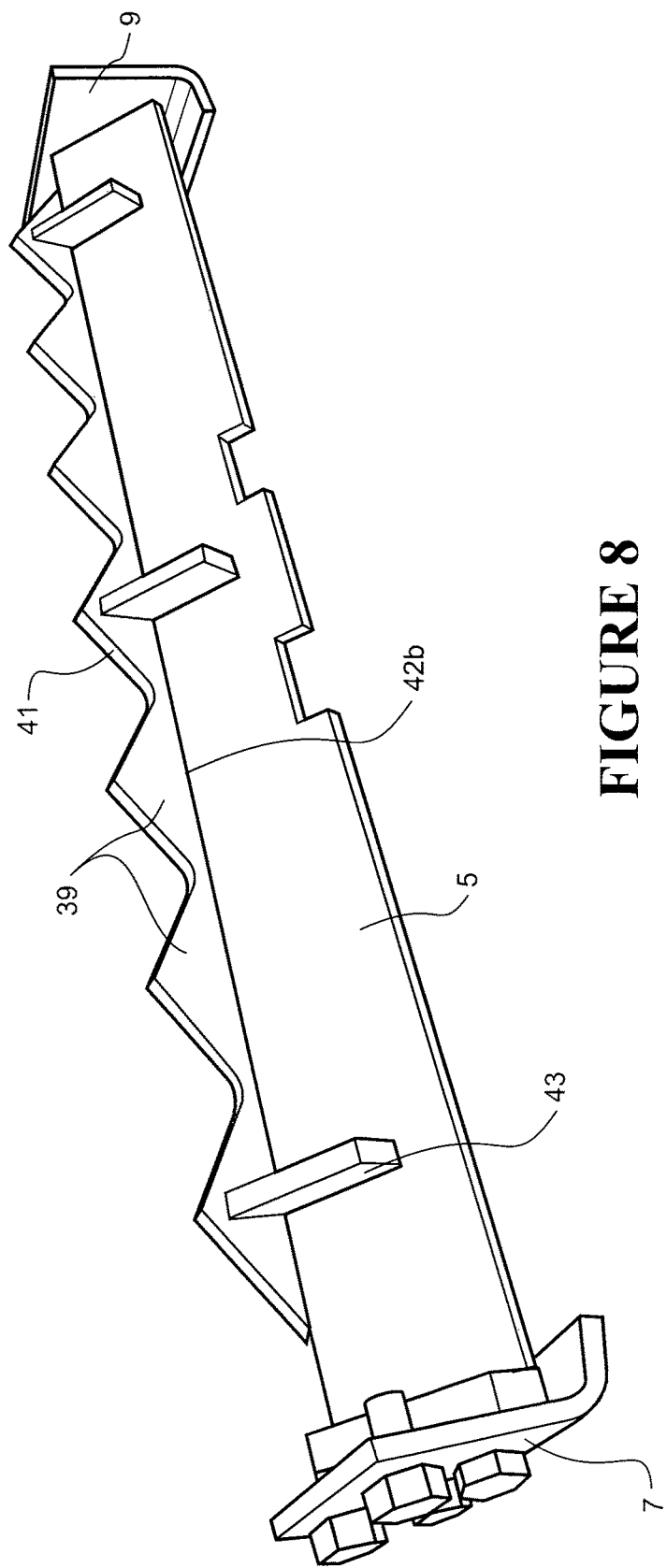
FIG. 8 is a perspective view of an embodiment of the device having alternative ground engaging features.
Figure 9:
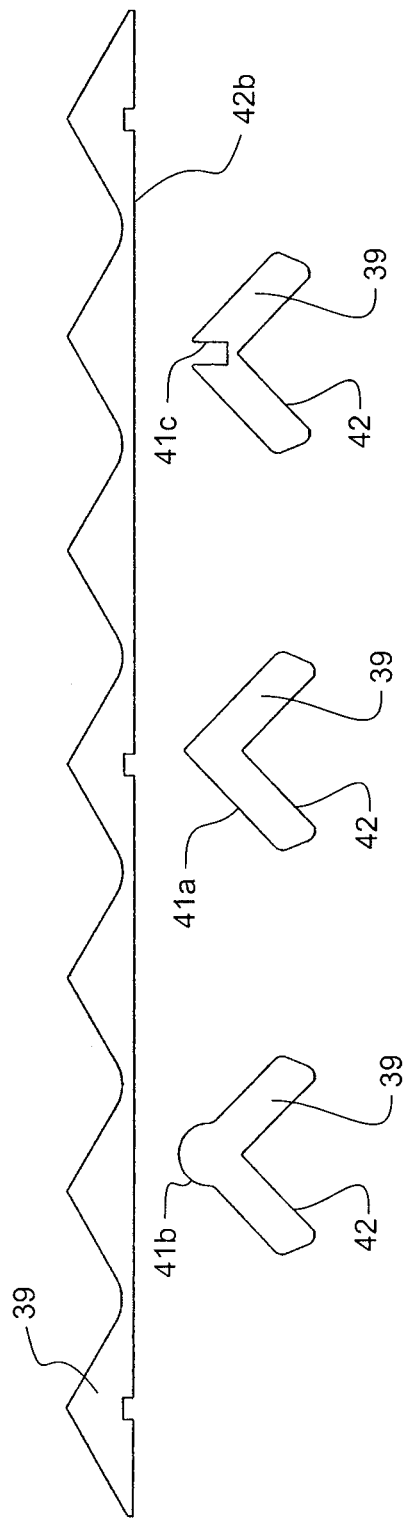
FIG. 9 is a side view of the alternative ground engaging features of FIG. 8.

With reference to FIGS. 7 to 9, the device may be provided with one or more ground engaging feature(s) that project(s) beyond the surface of the elongate body 5. In the embodiment shown in FIG. 7, the device comprises a plurality of ground engaging features, in the form of teeth 39. The teeth 39 are operatively attached to the elongate body 5. In the embodiment shown, the teeth 39 are attached directly to the elongate body 5 by welding (not shown). Alternatively, the teeth 39 may be connected to the elongate body 5 via spacers or other components. The teeth 39 may be evenly or unevenly spaced along the length of the elongate body 5. FIG. 9 is a side view of each of the alternative ground engaging features.

In the embodiment shown in FIG. 7, the teeth have a generally chevron or inverted V-shaped ground engaging surface 41, when viewed from an end of the elongate body. Each of the teeth has an abutment face 42 for attaching the tooth to the elongate body 5. The abutment face 42 of each tooth is a generally chevron or inverted V-shaped face generally corresponding to the profile of the elongate body 5.

In the embodiment shown in FIG. 8, the teeth 39 are generally triangular components that each has a generally chevron or inverted V-shaped ground engaging surface 41, when viewed from a side of the elongate body. The teeth are connected together to form a saw tooth-like part. Alternatively, the teeth may be separate parts. FIG. 9 shows a side view of the saw tooth-like part.

In the embodiment shown in FIG. 8, the teeth are integrally formed and have an elongate abutment surface 42*b* for attaching the teeth 39 to the elongate body 5. The device further comprises braces 43 extending downwardly and outwardly from the teeth for attaching the teeth to the elongate body. The braces 43 extend from each side of the teeth 39. The teeth may be attached to the elongate body by welding the abutment surface and the braces 43 to the elongate body. Alternatively, the teeth 39 may be integrally formed with the elongate body 5.

FIGS. 7 and 9 show various profiles of the ground engaging surfaces of the teeth 39. The teeth may have a triangular ground engaging surface, indicated by reference number 41*a*. Alternatively, the ground engaging surface may be formed with a protuberance, indicated by reference number 41*b* or with a notch 41*c*. Further, the ground engaging surfaces may be formed with further tread or rough surface to further improve the traction of the tracked vehicle with the device.

Figure 10:
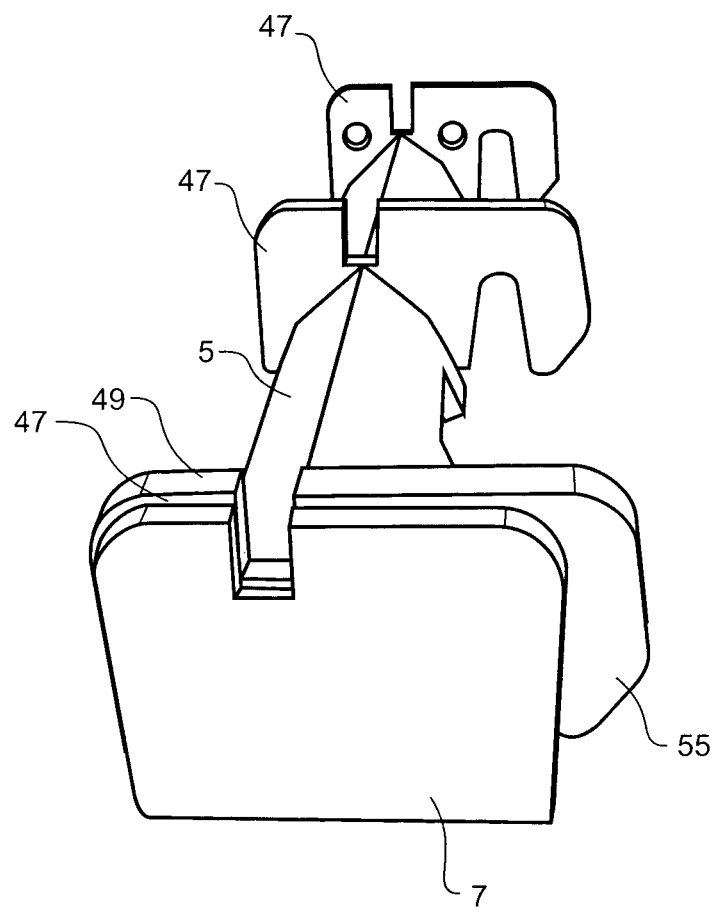
FIG. 10 is a schematic perspective view of an embodiment of the device having further alternative ground engaging features.

With reference to FIG. 10, a further embodiment of the ground engaging features is shown. The ground engaging features shown in FIG. 10 are designed for use with a tracked vehicle in which the track shoes 3 have one or more grousers 45 extending across the transverse length of the track shoe, from one end of the track shoe to the other end of the track shoe. Usually, those types of tracks are found on bulldozers.

Figure 11:
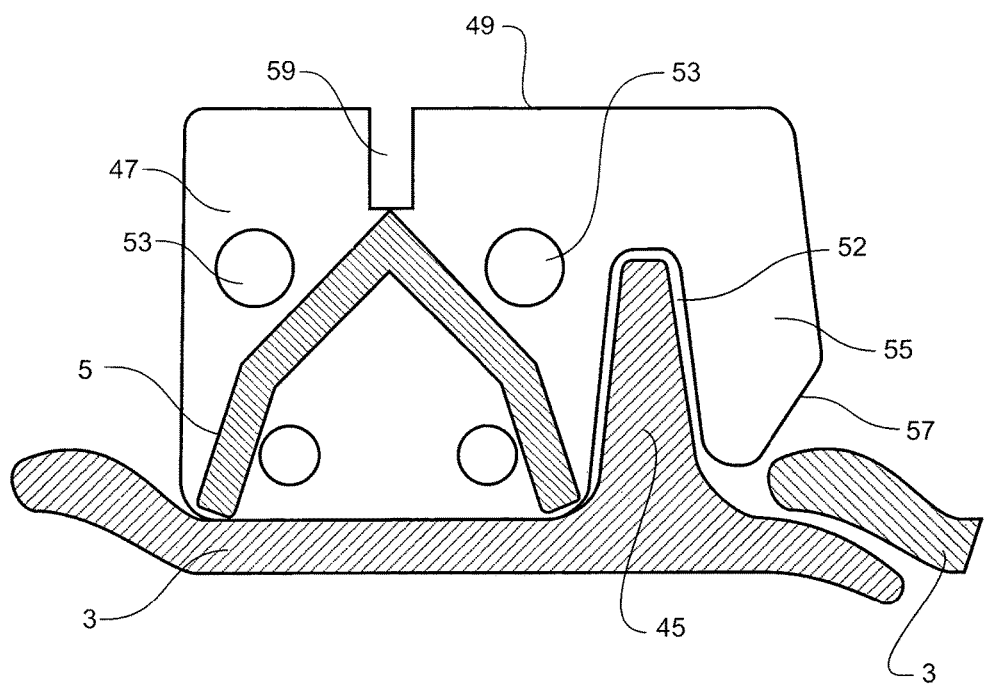
FIG. 11 is a cross-sectional view towards the releasable bracket end of the device shown in FIG. 10 secured to a track shoe, with the releasable bracket not shown.

With reference to FIGS. 10 and 11, the ground engaging features are in the form of teeth 47 that extend laterally relative to the length of the elongate body 5. Each tooth 47 has a generally flat and horizontal ground engaging surface 49, when viewed from the end of the elongate body. Alternatively, each tooth 47 may have any other suitable profile, for example, a triangular shaped profile. FIG. 10 shows one tooth positioned at the end of the elongate body near the releasable bracket, one tooth positioned near the fixed bracket, and one intermediate tooth. It will be appreciated that the device may have more or less teeth, for example, two teeth or five teeth.

Figure 15:
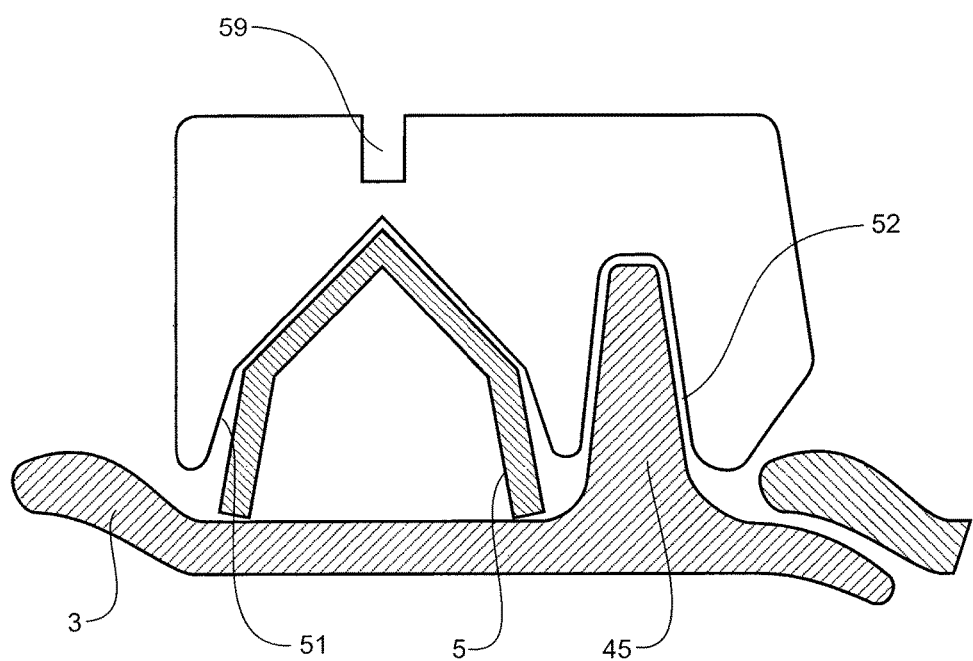
FIG. 15 is a cross-sectional view of the device of FIG. 10 showing a ground engaging feature positioned intermediate the releasable bracket end and the fixed bracket end of the device.

With reference to FIG. 15, the intermediate tooth has an abutment face 51 for attaching the tooth to the elongate body 5. The elongate body 5 has a generally triangular or inverted V-shaped cross-sectional profile and the abutment face 51 of the intermediate tooth may be a generally chevron or inverted V-shaped face generally corresponding to the profile of the elongate body. Additionally, when the track shoe has a grouser 45, the tooth 47 has a corresponding recess 52 having a profile corresponding to the profile of the grouser.

Figure 12:
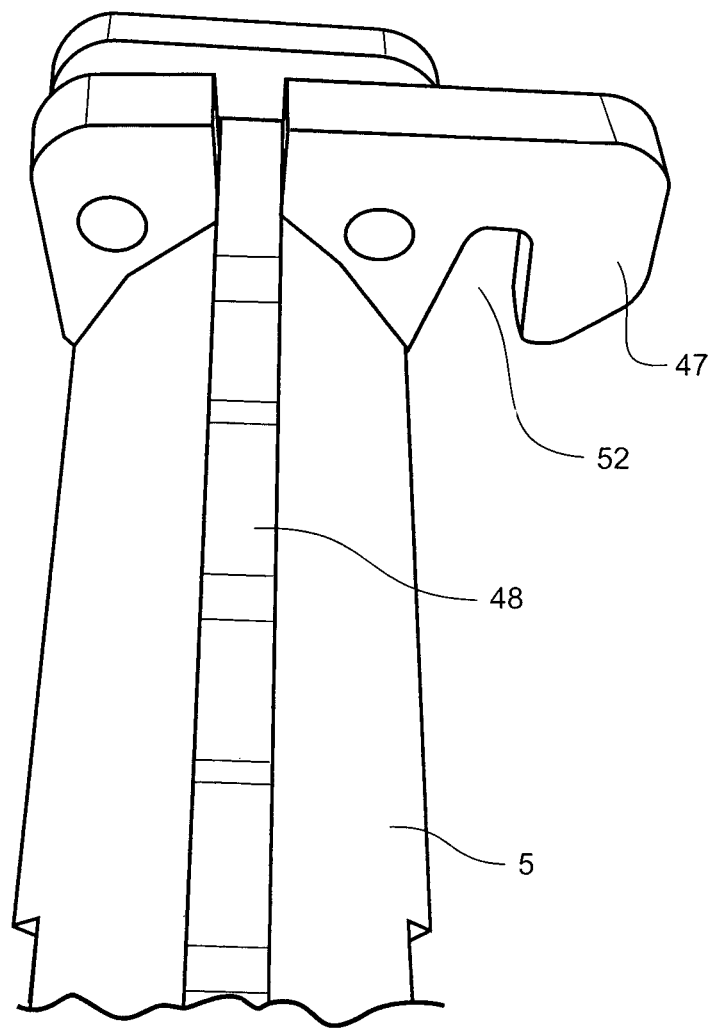
FIG. 12 is a partial perspective view from above of the releasable bracket end of the device shown in FIG. 10, with the releasable bracket.
Figure 13:
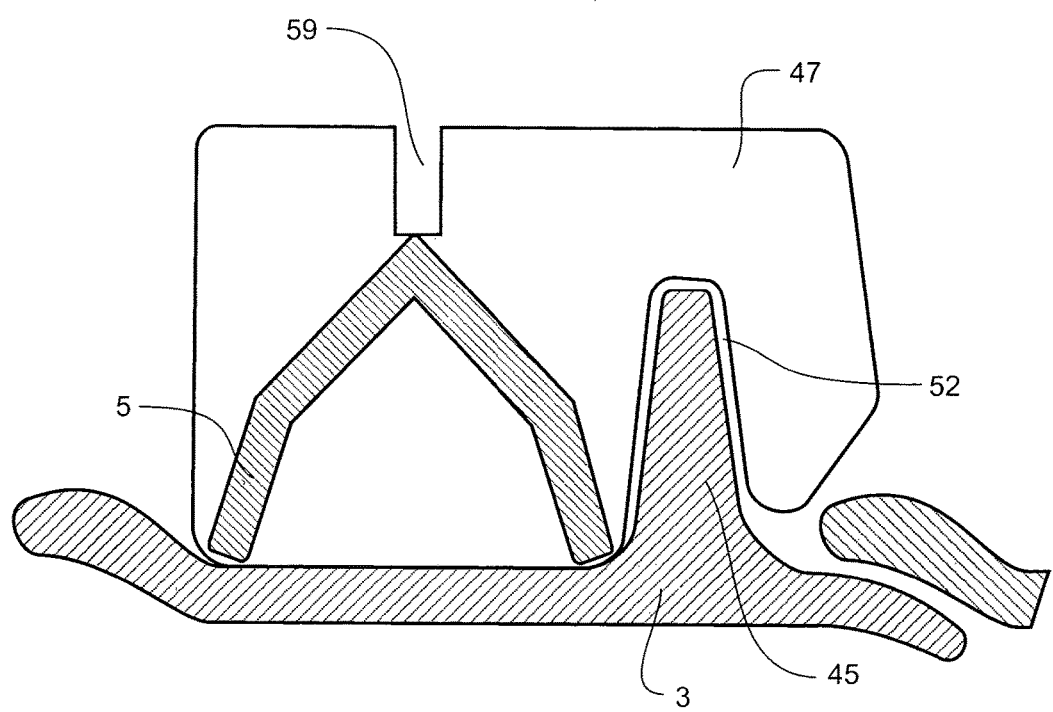
FIG. 13 is a cross-sectional view towards the fixed bracket end of the device shown in FIG. 10 secured to a track shoe, with the fixed bracket not shown.
Figure 14:
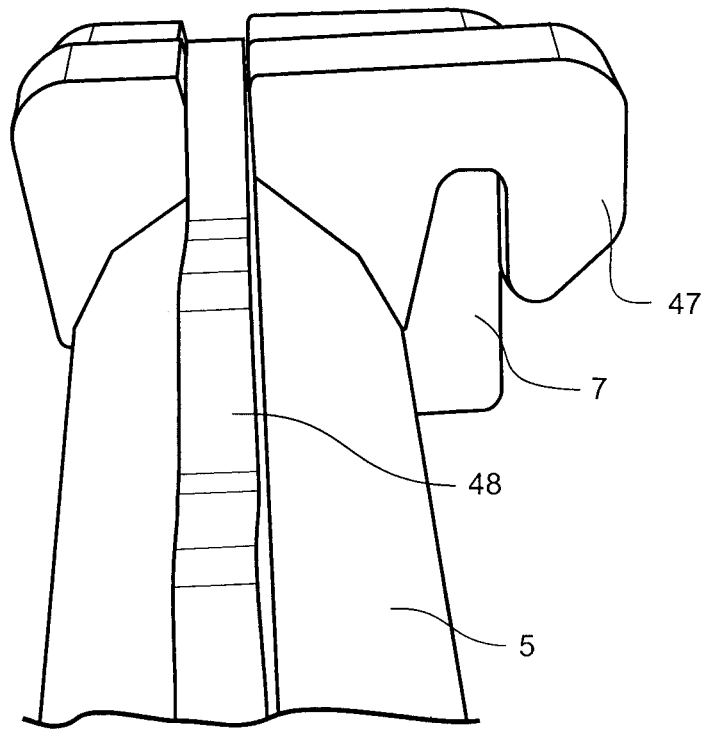
FIG. 14 is a partial perspective view from above of the fixed bracket end of the device shown in FIG. 10, with the track shoe not shown.

FIGS. 11 and 12 show a tooth 47 positioned near the releasable bracket end of the elongate body and FIGS. 13 and 14 show a tooth 47 positioned near the fixed bracket end of the elongate body. The teeth at the ends of the elongate body have a recess 52 having a profile corresponding to the profile of the grouser. The end teeth do not have an abutment face with a profile corresponding to the profile of the elongate body. However, it will be appreciated that the teeth at the ends of the elongate body may have that feature.

With reference to FIG. 11, the tooth has clearance apertures 53 that the studs of the releasable bracket extend through, when the device is secured to a track shoe. The clearance apertures may be circular or oval shaped apertures. The grouser 45 has a substantially wedge-shaped profile and each tooth 47 has a corresponding wedge-shaped recess 52. The leading portion 55 of the tooth 47 is relatively shorter on one side of the grouse than the remainder of the tooth and has an upwardly tapered surface 57 to provide clearance for the adjacent track shoe 3. The teeth 47 are rigid teeth. In the embodiment shown, the teeth 47 are formed from sheet or plate metal, preferably mild steel. The teeth are welded to the elongate body. Alternatively, the teeth may be integrally formed with the elongate body 5.

Figure 16:
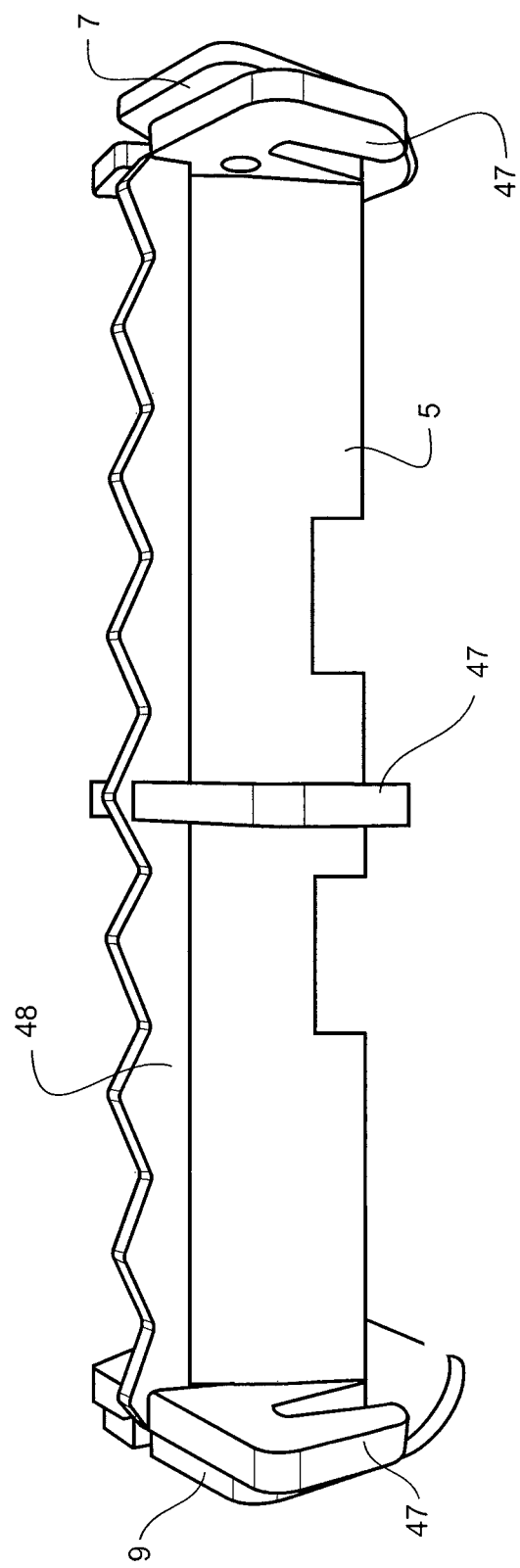
FIG. 16 is a perspective view of the device of FIG. 10 with a further ground engaging feature.

Each tooth 47 may have a slot 59 adapted to receive additional ground engaging features. The additional ground engaging features may be teeth 48 extending generally parallel to the longitudinal axis of the elongate body, such as those shown in FIG. 12. Those teeth may have a generally chevron or inverted V-shaped ground engaging surface, when viewed from a side of the elongate body, as shown in FIG. 16. The teeth may be separate parts or may be connected together to form a saw tooth-like part. The teeth are suitably welded to the elongate bodies.

Figure 17:
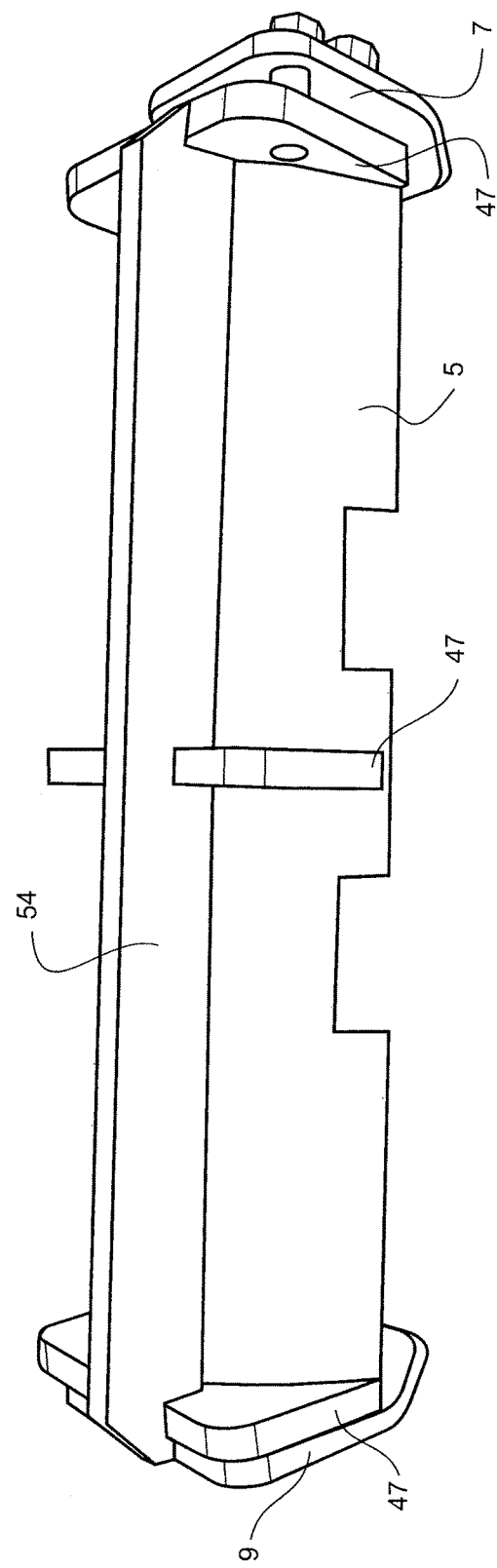
FIG. 17 is a perspective view of the device of FIG. 10 with yet another ground engaging feature.

The additional ground engaging feature may have an upper flat surface, as shown in FIG. 17. The ground engaging feature shown in FIG. 17 is an elongate, rigid component 54, which can be welded to the elongate body 5. The device may further have spikes (not shown) attached to the elongate body 54. Those spikes can be useful for icy or snowy conditions, for example.

Figure 18:
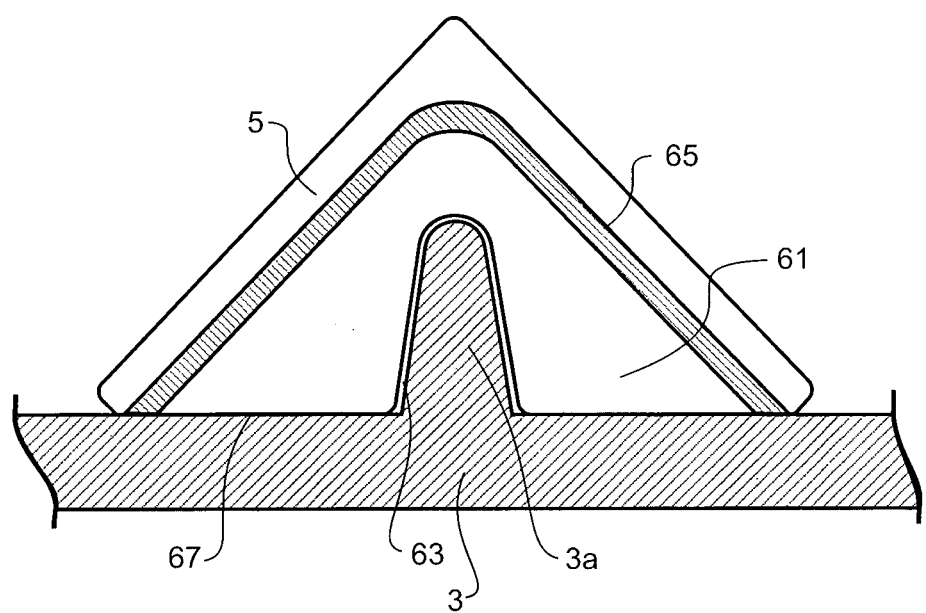
FIG. 18 is a cross-sectional view of the device showing a feature that locates the device relative to a rib of the track shoe.

With reference to FIG. 18, the device may have one or more gussets 61 to assist locating and/or securing the device 1 to the track shoe 3. The gussets 61 are rigid gussets. In the embodiment shown, the gussets 61 are formed from sheet or plate metal, preferably mild steel. Each of the gussets 61 is substantially triangular in shape, corresponding to the shape of the elongate body 5. Each of the gussets 61 has a recess 63 that is adapted to receive a rib 3*a* of the track shoe. The size and shape of the recess 63 will be chosen or designed depending on the size and shape of the rib 3*a*. The gusset(s) 61 is/are welded 65 to the elongate body 5. Alternatively, the gusset(s) may be integrally formed with the elongate body.

FIG. 18 shows that a lower surface 67 of the gusset sits adjacent an upper surface of the track shoe 3, when the device 1 is installed on the track shoe. Alternatively, the gusset 61 may extend only part way towards the upper surface of the track shoe so that there is a gap between the lower surface of the gusset and the upper surface of the track shoe The elongate body 5, brackets 7, 9 and teeth 39 may be formed from a suitable metallic material, such as mild steel. In the form shown, the elongate body 5 is formed from a single length of angle iron. The flanges may be formed from steel plate and welded to the end of the elongate body. The elongate body 5 also could be made out of two pieces of sheet or plate material, which is then bent into shape and welded along the top to form a shape generally as shown. This method may be required if a full angle iron is not available to suit the track shoe.

The brackets 7, 9 may be formed from steel plate and bent into the required shape. Alternatively, the brackets may be cast into the required shape. The studs of the releasable bracket may be formed by welding bolts or rods to the bracket body. Alternatively, the studs may be integrally formed as part of the bracket, for example, by casting or forging the bracket.

The fixed bracket 9 may be welded to the elongate body 5. Alternatively, the fixed bracket may be formed as a separate component that is fixed to the elongate body, for example, by fasteners. In another alternative, the elongate body and fixed bracket may be formed as a single integral component.

To assemble the device to the track, the elongate body 5 is placed on the track as shown in FIGS. 2 and 4. The elongate body is adapted to nest between ribs of a rigid track shoe of the continuous track. The elongate body nests between two side ribs 3a of the track shoe and extends the transverse length of the shoe, between the side edges 3b of the track.

FIG. 4 shows the track shoe having a central rib 3c. In the embodiment shown, the elongate body has a clearance slot 35 allowing the elongate body to extend over the central rib 3c. The elongate body has further clearance slots 37 allowing the elongate body to sit over track fasteners.

When assembled with the track shoe, the elongate body substantially fills the gap between the side ribs and contacts the side ribs. Alternatively, the elongate body may nest between two adjacent side ribs. The elongate body extends across the transverse length of the track shoe, from one end of the track shoe to the other end of the track shoe.

With reference to FIG. 2, the elongate body is placed on the track with the leg 27 of the fixed bracket positioned below the underside of the track. The releasable bracket may be loosely attached to the elongate body 5 before assembly to the track to decrease the time required to attach the device to the track, as shown in FIG. 3. Alternatively, the releasable bracket may not be attached to the elongate body 5 before the device is placed on the track, as shown in FIG. 2.

Figure 6:
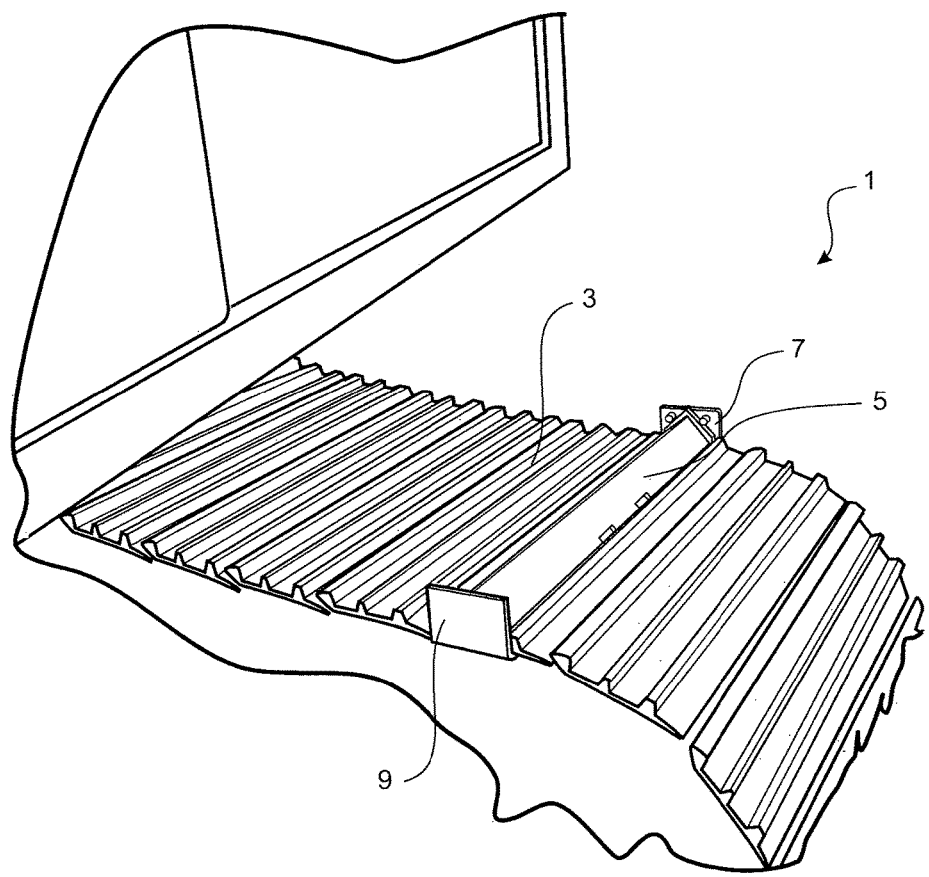
FIG. 6 is a perspective view of the device, in which the releasable bracket is secured to the continuous track.

When the fasteners 17 are tightened, the bracket body 11 and elongate body 5 are drawn together in a generally horizontal direction. Fastening the fastener causes the leg 15 to engage with the underside of the track shoe and draw the studs 13 towards the elongate body to releasably secure the elongate body to the continuous track. As the bracket body 11 and elongate body 5 are drawn together, the end of the elongate body and the end of the track shoe are wedged between the studs 13 and the leg 15 to secure the elongate body 5 to the track 3. When secured, the studs contact the flanges 33 of the elongate body 5 and the leg contacts the underside surface of the track shoe. The secured bracket is shown in FIG. 6.

The clearance slots 19 formed in the bracket body allow the bracket to move relative to the elongate body 5 in the generally vertical direction as the fastener is tightened.

Tightening the releasable bracket to the track will simultaneously cause the fixed bracket and the other end of the elongate body 5 to be drawn towards the corresponding edge of the track. That movement releasably secures the other end of the elongate body 5 to the track. Due to the angle of the leg 27 that engages with the underside of the track shoe, that movement also pulls that end of the elongate body 5 down into secure engagement with the track shoe.

The device may be provided as a kit of parts for assembling the device for use with a continuous track of a tracked vehicle to enhance the traction of the vehicle. The kit of parts may include the rigid elongate body 5 and a pair of brackets for releasably securing the elongate body 5 to the continuous track 3. The pair of brackets comprises a releasable bracket 7 and a fixed bracket 9, of the form described above.

The kit may comprise one or more ground engaging features, in the form of one or more teeth 39 that project beyond the surface of the elongate body when attached to the elongate body 5. The teeth have a generally chevron or inverted V-shaped ground engaging surface. Each of the teeth has an abutment face for attaching the tooth to the elongate body. The abutment face of each tooth is a generally chevron or inverted V-shaped face generally corresponding to the profile of the elongate body. The teeth may be separate parts or may be connected together to form a saw tooth-like part.

Alternatively, the device may be provided with the ground engaging features connected to the elongate body 5.

Over time, track shoes can become worn and the thickness of the track shoe can decrease. The relative angle between the leg and the studs allows the device to be used on continuous tracks having different track shoe thicknesses because the distance between the studs and the bracket leg can be adjusted to suit thinner tracks by tightening the fastener In use, more than one device would be used on the continuous track. For example, a continuous track may have about five or six devices along the track, spaced about one meter apart. The number of devices used on a track can be chosen depending on the traction required for any particular situation.

The device may also be useful in situations where the vehicle is stuck, such as in very muddy situations. One end of a chain can be attached to the device 1 and the other end can be secured. The vehicle can then be driven forward by the vehicle pulling on the chain.

The device 1 can be removed by loosening the fastener 17, which will release the releasable bracket and the fixed bracket from the track. The elongate body 5 can then be removed from the track.

Embodiments of the invention have been described by way of example only and modifications may be made thereto without departing from the scope of the invention.

For example, in one alternative embodiment, the bracket leg may extend generally perpendicularly from the bracket body and the studs may extend at a non-perpendicular angle relative to the bracket body. In another alternative embodiment, the bracket leg and studs may extend at non-perpendicular angles relative to the bracket body.

In the embodiment shown, the first clamping member is defined by two studs. Alternatively, the first clamping member may be formed by any other suitable protrusion(s), such as ribs, plates, bosses or shoulders, for example.

For example, the ground-contacting surface may be formed with a textured surface and/or outwardly extending features to further enhance the traction of the device and the continuous track.

For example, the ground engaging features have been described as teeth having triangular or chevron shaped components. Alternatively, the teeth may have any other suitable shape, such as rectangular or square, for example. Those alternative shapes may also be formed with notches or projections as described above in relation to the triangular shaped teeth.

It will be appreciated that the device may a multi-fit device that may be used for different tracked vehicles. Such a multi-fit device may be narrower, for example, to fit the various different types of tracks, or have features that allow the device to be positioned on or adjacent a grouser of a track shoe.

Other alternatives to the embodiments described are set out in the 'Summary of the Invention' section.

The invention claimed is:
1. A device for use with a continuous track of a tracked vehicle to enhance the traction of the vehicle, the device comprising:

an elongate body having an elongate direction and a ground contacting surface; and a releasable bracket for releasably securing the elongate body to the continuous track, the bracket comprising a bracket body, a first clamping member extending from the bracket body, a second clamping member extending from the bracket body at an acute angle relative to the first clamping member, and a fastener;

wherein the bracket comprises a clearance aperture through which the fastener extends and the bracket is arranged such that fastening the fastener draws the releasable bracket in the elongate direction of the elongate body and causes the second clamping member to draw the bracket body and the first clamping member towards the elongate body in a second direction that is generally transverse to the elongate direction to releasably secure the elongate body to the continuous track by wedging the elongate body and the track shoe between the first clamping member and the second clamping member, and wherein the clearance aperture allows the bracket body and the first clamping member to move relative to the elongate body in the second direction.

2. A device as claimed in claim 1, wherein the device further comprises a fixed bracket that is fixed to the elongate body.

3. A device as claimed in claim 1, wherein the device comprises two releasable brackets for releasably connecting the device to the shoe of the continuous track, and each releasable bracket has the bracket body, the first clamping member, the second clamping member extending at an acute angle relative to the first clamping member, and the fastener.

4. A device as claimed in claim 1, wherein the first clamping member of the releasable bracket comprises one or more projections for engaging with a surface of the elongate body.

5. A device as claimed in claim 1, wherein the second clamping member comprises a leg extending at an acute angle from the bracket body.

6. A device as claimed in claim 1, wherein the device has additional ground contacting features to further enhance the traction of the device.

7. A device as claimed in claim 1, wherein the ground contacting surface of the elongate body has a generally triangular cross-sectional profile.

8. A device as claimed in claim 1, wherein the cross-sectional profile of the ground contacting surface is substantially constant along the length of the elongate body.

9. A device as claimed in claim 1, wherein the elongate body is substantially rigid.

10. A combination of a track shoe and at least one device as claimed in claim 1 secured to the track shoe.

11. A combination as claimed in claim 10, wherein the track shoe comprises side ribs with a gap between the side ribs, and the elongate body of the device substantially fills the gap between the side ribs and contact the side ribs.

12. A combination as claimed in claim 10, wherein the track shoe further comprises an intermediate rib positioned between the two side ribs, and the elongate body nests between two side ribs of the track shoe and extends over the intermediate rib.

13. A combination as claimed in claim 10, wherein the elongate body extend across the transverse length of the track shoe, from one end of the track shoe to the other end of the track shoe.

14. A combination as claimed in claim 10, wherein the device is releasably secured to the continuous track.

15. A combination of a continuous track with at least one device as claimed in claim 1 secured to the track.

16. A device for use with a continuous track of a tracked vehicle to enhance the traction of the vehicle, the device comprising:

an elongate body having a surface;

a bracket arranged to secure the elongate body to the continuous track, the bracket comprising a ground engaging feature; and a plurality of rigid teeth operatively attached to the elongate body and projecting beyond the surface of the elongate body, the teeth being formed from a plate and each tooth having a generally chevron or inverted V-shaped ground engaging surface; wherein the elongate body and/or the teeth enhance traction of the vehicle in the running direction of the track and the ground engaging feature of the bracket enhances traction of the vehicle in a direction transverse to the running direction of the track, wherein the plurality of rigid teeth has a slot adapted to receive additional ground engaging features.

17. A device as claimed in claim 16, wherein each of the teeth has a generally flat and horizontal ground engaging surface, when viewed from an end of the elongate body.

18. A device as claimed in claim 16, wherein the device is releasably secured to the continuous track.

19. A device as claimed in claim 16, wherein the device comprises a releasable bracket for releasably securing the elongate body to the continuous track.

20. A device as claimed in claim 19, wherein the releasable bracket comprises a bracket body, a first clamping member extending from the bracket body, a second clamping member extending from the bracket body at an acute angle relative to the first clamping member, and a fastener, wherein the bracket is arranged such that fastening the fastener causes the bracket body to wedge the elongate body and the track shoe between the first clamping member and the second clamping member.

21. A device as claimed in claim 20, wherein the bracket body/bodies form ground engaging feature(s).

22. A device as claimed in claim 21, wherein a top surface of the bracket(s) is a substantially planar surface for contacting the ground surface.

23. A device as claimed in claim 21, wherein a top surface of the bracket(s) has serrations or teeth for contacting the ground surface.

24. A device as claimed in claim 16, wherein the device further comprises a further bracket for releasably securing the elongate body to the other side edge of the continuous track, the further bracket comprising a bracket body.

25. A device as claimed in claim 24, wherein the further bracket is a fixed bracket that is permanently fixed to the elongate body.

26. A device as claimed in claim 24, wherein the further bracket is a releasable bracket that is releasably secured to the elongate body.

27. A device as claimed in claim 16, wherein the bracket(s) is/are positioned at the end(s) of the elongate body.

28. A device as claimed in claim 16, wherein the additional ground engaging features comprise one or more additional teeth.

29. A device as claimed in claim 28, wherein each of the one or more additional teeth has a generally chevron or inverted V-shaped ground engaging surface, when viewed from a side of the elongate body.

30. A device as claimed in claim 16, wherein the device comprises a releasable bracket for releasably securing the elongate body to the continuous track.

31. A device as claimed in claim 30, wherein the releasable bracket comprises a bracket body, a first clamping member extending from the bracket body, a second clamping member extending from the bracket body at an acute angle relative to the first clamping member, and a fastener, wherein the bracket is arranged such that fastening the fastener causes the bracket body to wedge the elongate body and the track shoe between the first clamping member and the second clamping member.

32. A device as claimed in claim 31, wherein the bracket body/bodies form ground engaging feature(s).

33. A device as claimed in claim 32, wherein a top surface of the bracket(s) is a substantially planar surface for contacting the ground surface.

34. A device as claimed in claim 32, wherein a top surface of the bracket(s) has serrations or teeth for contacting the ground surface.

35. A device for use with a continuous track of a tracked vehicle to enhance the traction of the vehicle, the device comprising:
an elongate body having a surface;
a bracket arranged to secure the elongate body to the continuous track; and
a plurality of rigid teeth operatively attached to the elongate body and projecting beyond the surface of the elongate body,
wherein the plurality of rigid teeth has a slot adapted to receive additional ground engaging features.

36. A device as claimed in claim 35, wherein the additional ground engaging features comprise one or more additional teeth.

37. A device as claimed in claim 36, wherein each of the one or more additional teeth has a generally chevron or inverted V-shaped ground engaging surface, when viewed from a side of the elongate body.

38. A device as claimed in claim 35, wherein the device is releasably secured to the continuous track.

39. A device as claimed in claim 35, wherein the device further comprises a further bracket for releasably securing the elongate body to the other side edge of the continuous track, the further bracket comprising a bracket body.

40. A device as claimed in claim 39, wherein the further bracket is a fixed bracket that is permanently fixed to the elongate body.

41. A device as claimed in claim 39, wherein the further bracket is a releasable bracket that is releasably secured to the elongate body.

42. A device as claimed in claim 35, wherein the bracket(s) is/are positioned at the end(s) of the elongate body.

* * * * *